(12) United States Patent
Haberman et al.

(10) Patent No.: US 9,357,270 B2
(45) Date of Patent: May 31, 2016

(54) SYSTEM AND METHOD FOR SIMULTANEOUS BROADCAST FOR PERSONALIZED MESSAGES

(71) Applicant: Visible World, Inc., New York, NY (US)

(72) Inventors: Seth Haberman, New York, NY (US); Chester L. Schuler, Marlboro, MA (US); Abeljan van der Burgh, New York, NY (US); Alex Jansen, Jersey City, NJ (US); Gerrit Niemeijer, Maplewood, NJ (US)

(73) Assignee: Visible World, Inc., New York, NY (US)

( * ) Notice: Subject to any disclaimer, the term of this patent is extended or adjusted under 35 U.S.C. 154(b) by 0 days.

(21) Appl. No.: 14/065,123

(22) Filed: Oct. 28, 2013

(65) Prior Publication Data

US 2014/0053188 A1    Feb. 20, 2014

Related U.S. Application Data

(63) Continuation of application No. 09/841,465, filed on Apr. 24, 2001, now Pat. No. 8,572,646, which is a continuation-in-part of application No. 09/545,015, filed on Apr. 7, 2000, now Pat. No. 8,006,261.

(60) Provisional application No. 60/236,990, filed on Sep. 29, 2000.

(51) Int. Cl.
*H04N 7/10* (2006.01)
*H04N 7/025* (2006.01)
(Continued)

(52) U.S. Cl.
CPC .......... *H04N 21/4882* (2013.01); *G11B 27/031* (2013.01); *H04N 7/088* (2013.01); *H04N 7/173* (2013.01); *H04N 21/258* (2013.01); *H04N 21/25883* (2013.01); *H04N 21/25891* (2013.01); *H04N 21/2668* (2013.01); *H04N 21/435* (2013.01); *H04N 21/454* (2013.01); *H04N 21/4532* (2013.01); *H04N 21/4786* (2013.01); *H04N 21/4788* (2013.01); *H04N 21/6408* (2013.01); *H04N 21/812* (2013.01); *H04N 21/854* (2013.01); *G11B 27/032* (2013.01); *G11B 27/034* (2013.01);
(Continued)

(58) Field of Classification Search
USPC ....................................................... 725/32–36
See application file for complete search history.

(56) References Cited

U.S. PATENT DOCUMENTS 6,029,045 A * 2/2000 Picco et al. ................... 725/34
6,601,237 B1 * 7/2003 Ten Kate et al. ............. 725/47
(Continued)

*Primary Examiner* — Nasser Goodarzi
*Assistant Examiner* — Fred Peng
(74) *Attorney, Agent, or Firm* — Pepper Hamilton LLP

(57) ABSTRACT

A system and method for the simultaneous creation, assembly and transmission of synchronous multiple personalized messages to specific targeted individuals or other entities. The system can send rich media distinctly personalized messages such as commercials to a small or large group of selected individuals through any appropriate distribution media. A personalized message is created based on segmenting a message into multiple slots, and providing different selectable segments for each slot. The multiple segments are then simultaneously broadcasted over multiple data streams to a receiver, wherein the receiver switches between the data streams to assemble the personalized message in a just-in-time fashion. Other data including overlays, animation, frame transitions etc. may also be transmitted and used to assemble the personalized message.

20 Claims, 13 Drawing Sheets

(51) Int. Cl.
  *H04N 21/488* (2011.01)
  *G11B 27/031* (2006.01)
  *H04N 7/088* (2006.01)
  *H04N 7/173* (2011.01)
  *H04N 21/258* (2011.01)
  *H04N 21/2668* (2011.01)
  *H04N 21/45* (2011.01)
  *H04N 21/454* (2011.01)
  *H04N 21/4786* (2011.01)
  *H04N 21/4788* (2011.01)
  *H04N 21/6408* (2011.01)
  *H04N 21/81* (2011.01)
  *H04N 21/854* (2011.01)
  *H04N 21/435* (2011.01)
  *G11B 27/032* (2006.01)
  *G11B 27/034* (2006.01)

(52) U.S. Cl.
  CPC ............ *G11B 2220/2545* (2013.01); *G11B 2220/2562* (2013.01); *G11B 2220/90* (2013.01)

(56) References Cited

U.S. PATENT DOCUMENTS

| | | | |
|---|---|---|---|
| 8,572,646 B2* | 10/2013 | Haberman et al. | 725/34 |
| 8,914,825 B1* | 12/2014 | Harvey et al. | 725/35 |
| 2001/0013124 A1* | 8/2001 | Klosterman et al. | 725/36 |
| 2005/0166224 A1* | 7/2005 | Ficco | 725/35 |
| 2012/0159539 A1* | 6/2012 | Berberet et al. | 725/34 |
| 2012/0192224 A1* | 7/2012 | Eldering et al. | 725/32 |
| 2012/0240149 A1* | 9/2012 | McCoy et al. | 725/32 |

\* cited by examiner

SYSTEM AND METHOD FOR SIMULTANEOUS BROADCAST FOR PERSONALIZED MESSAGES

RELATED APPLICATION

This patent application is a continuation of U.S. application Ser. No. 09/841,465, patented as U.S. Pat. No. 8,572,646, filed Apr. 24, 2001, which is a continuation-in-part of and claims the benefit of U.S. application Ser. No. 09/545,015 filed on Apr. 7, 2000, and also claims priority to U.S. Provisional Application Ser. No. 60/236,990 filed Sep. 29, 2000 by Haberman et al., all of which are hereby incorporated by reference.

FIELD OF THE INVENTION

This invention is directed towards media (video, audio, text, graphics, etc.) creation and delivery, and more particularly towards a system for creating, delivering, and assembling personalized messages based on user information.

BACKGROUND

Marketers have come to rely on demographic solutions to establish patterns and trends about the purchasing habits of customers and how these habits relate to purchases, demographics, and other factors. Alongside companies' proprietary databases, third party data warehouses have evolved, fashioned by many companies who share information either about specific customers or about data extracted from their customer bases. In both cases, advertisers use the derived information to generate observations relating to their markets, target individuals to different types of offerings and select appropriate media purchases for advertising.

In the case of video advertising media, e.g., video tapes that are mailed, internet video streams, or broadcast television (whether via terrestrial, cable, satellite, or any other distribution medium) advertising—there are only limited means to produce and/or deliver personalized versions of the advertisements that directly take advantage of the information available about consumers purchasing habits and the like. Mostly, this reflects the nature (such as bandwidth constraints) of the traditional delivery media for video, which provide very limited capability to deliver anything more than a common message.

FIG. 1 shows the global layout of a broadcast delivery chain as deployed today. In this model, each source has a separate channel to all receivers (which can be separate set-top boxes, televisions, etc.). The same information is send to all receivers. If someone wants to create a source that must only go to a subset of the receivers, they must create a new channel and limit the receivers to only receive that channel they are entitled to show. Personalization creates different variants of the source for different receivers. Potentially this can lead to a different variant for each receiver. Adding personalization to this model would mean that, worst-case, every source would need a separate channel to every receiver, which is impossible under the current bandwidth limitations. Basically every user would need a high bandwidth point-to-point connection to the source. Although current VOD (video on demand) systems deployed on digital networks provide high bandwidth channels to viewers, these systems are still very expensive, and can only serve a limited percentage of the total subscriber base simultaneously. Thus, within the currently existing bandwidth constraints, only a few different variations of the same channel can be transmitted simultaneously, allowing personalization only for a few viewers, or very limited personalization for large groups of viewers. This makes the tradeoff between bandwidth lost and capabilities gained not interesting enough. There really must be a higher level of personalization for a larger amount of viewers with the same bandwidth tradeoff before this becomes interesting.

In addition to the limitations imposed by the delivery medium, no advertiser is going to create/produce many different versions of one and the same message, simply because there is no time and/or resources to create the required diversity. The nature of video production, focused typically on one sequential video story, does not allow for incremental content changes. This forces advertisers to avoid topically relevant information and offerings.

As such, even though companies know a tremendous amount of information about their customers, the ability to leverage this information has been limited by the nature of video creation/production and the fundamentals of the broadcast medium, requiring a bland vanilla message to be sent to all customers.

SUMMARY

The present invention provides for a system for the simultaneous creation/production, delivery/transmission, and assembly of synchronous multiple personalized messages to specific targeted individuals, households, or other entities. The system can send rich media distinctly personalized messages to a small or large group of selected individuals through any appropriate distribution media.

The present invention includes a system and method for allowing the creation of a plurality of personalized messages comprising creating a personalized message template with a plurality of slots in sequence, wherein at least one of the slots can include one of a plurality of different segments, with all segments for a particular slot being a same length. The method includes providing a plurality of data streams to a receiving unit, each data stream delivering a different one of the plurality of segments for the at least one slots, wherein the segments are synchronized to begin and end at substantially the same time, and providing content selection information regarding content of the plurality of data streams to the receiving unit, the information including switch times for the plurality of synchronized segments, to allow the receiving unit to select among the plurality of data streams for one of the segments for the particular slot, to assemble a personalized message.

The present invention also includes wherein the receiving unit selects among the plurality of data streams in real time, and also wherein the personalized message is viewed by a viewer as it is assembled. The receiving unit can select among the plurality of data streams based on the content selection information and information about a viewer who will view the personalized message. Further, a data stream may be provided with a default personalized message to allow the receiving unit to display the default personalized message without selecting between the plurality of data streams. The plurality of data streams may be MPEG encoded data streams, and further the plurality of data streams can be multiplexed into a transport stream.

The present invention also includes wherein the segments are incomplete parts of a personalized message. Further, the present invention includes wherein the receiving unit is a set top box. The set top box can receive both analog data streams and digital data streams, and the set top box can momentarily switch from an analog data stream to a digital data stream to play out a personalized message. Further, the set top box can switch from an analog data stream to a digital data stream triggered by VBI data. Alternatively, thee set top box can momentarily switch from a first digital data stream to a second digital data stream to play out a personalized message, however triggered. The set top box can receive a plurality of television channels over the data streams, and the channels include programs include a synchronized commercial break. During the synchronized commercial break, the data streams deliver segments to create a personalized message for display irrespective of which channel the set top box had selected.

The present invention also includes transition segments, which are inserted into the personalized message between the segments. Further it includes a plurality of templates for creating the personalized messages, wherein the templates include video sequence templates and audio sequence templates.

The present invention also includes a system and method for delivering a plurality of different messages over a television transmission network, including creating a plurality of different media segments, wherein the different media segments include incomplete sections of a complete message, and wherein at least one subset of the media segments are a same length. It includes transmitting a plurality of television programs to a television signal receiver, wherein the plurality of television programs have at least one synchronized commercial break; and during the synchronized commercial break, transmitting the plurality of different media segments to the television signal receiver, wherein all media segments in the at least one subset are transmitted simultaneously. The present invention further includes directing the television signal receiver to switch to one of the media segments in the subset as the media segments in the subset are received; and wherein after the synchronized commercial break, the television signal receiver switches to a previously selected television program.

An illustrative embodiment of the present invention provides all of the following functions:

Acquire and compile information that delineates the profiles of groups of individuals, enterprises, organizations or any identifiable entities. This information may be acquired through data mining organizations, collaborative profiling with the input of the entity to be characterized, regional and local demographics, the client customer, or other sources of information. This information will be organized in a special target entities information database. These profiles will be used to control specific profile driven message insertion and assembly units.

Acquire current information concerning news, weather, business conditions, user responses, and/or the status of any conditions relevant to the messaging content and/or context.

Provide for the creation, acquisition, synthesis, storage, and generation of multimedia (e.g., video, audio, still images, and text) modular information segments that can be generated and assembled utilizing entity profiles to drive rules based expert systems incorporated in message sequence templates. This information would constitute a resource library from which custom presentations for target individuals, or other entities could be assembled for the purpose of advertising, instruction, promotion, political persuasion, or any informational agenda. This material will be available through a special media database addressable via the semantics of composition.

Simultaneously and synchronously insert multimedia modular information segments and other information into the appropriate slots in a broadcast transmission stream for delivery to the entire selected group of users or entities at their media specific location.

Determine a message slot template based on which a profile driven assembly unit assembles personalized messages from the set of multimedia modular information segments and other information based upon each entity profile and its associated rules.

Track and verify all messages and provide for client reports and billing as required. Also monitor and receive responses if required or needed and analyze and compile such information for the client user.

U.S. Pat. No. 4,573,072 issued to Freeman, describes a system for switching between complete commercials sent over multiple channels, to allow different commercials to be displayed to a viewer, depending upon the viewer's interactive choices for commercial preferences. However, this patent only allows selection of substantially complete commercials, and has no disclosure of being able to assemble a personalized message in real time, both in terms of multiple segments for a message, but also in terms of various incomplete media components such as multiple and separate audio, video, graphics, rendering, and last minute information. Freeman also does not disclose both the synchronous and simultaneous insertion of modular incomplete media components to allow seamless assembly into complete personalized messages, which is enabled by digital television. Further, Freeman discloses using minimal or no criteria for selecting which commercial to show.

An advantage of the present invention includes an ability to deliver and distribute personalized messages over communication channels with present-day bandwidth limitations using present-day (already deployed) hardware and technology.

Another advantage of the present invention includes a system which allows for the efficient creation, production, delivery, transmission, and assembly of a very large number of personalized messages. This can typically be done at the same or lower cost (bandwidth, labor) required for doing the same steps for a few messages independent from each other.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

The goal of personalized messages is providing viewers with programs, messages and commercials that are more relevant given their personal situation. Personalized messages can be part of traditional broadcast (digital) television, advanced broadcast (digital) television (incl. video on demand) or streamed programs on the Internet (just like ordinary commercials). Some sample embodiments include Personalized Ads, Personalized News, etc.

Figure 3:
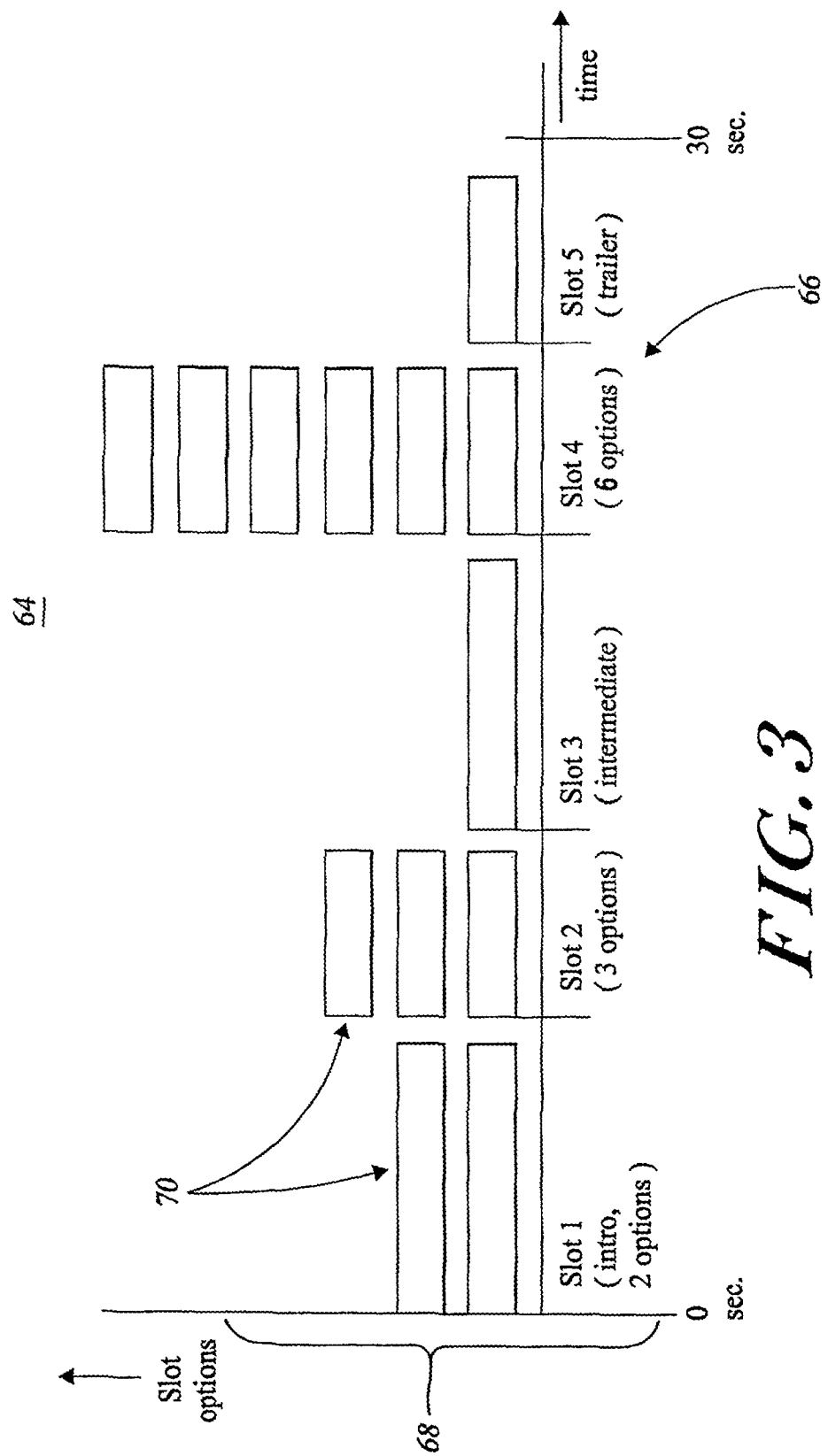
FIG. 3 is a block diagram of multiple segments for simultaneous broadcasting.

An important feature of personalized messaging is that the production of the personalized messages only requires limited extra effort compared to current messages (such as commercials). A solution to this requirement is described in detail in U.S. application Ser. No. 09/545,015 filed on Apr. 7, 2000 of which the present application hereby incorporates by reference. Generally, a system according to the invention works as shown in FIG. 3. A complete message or commercial 64 is segmented in a number of different (time)slots 66. Each timeslot can have an arbitrary length, as small as a second, or even less. The present invention allows for multiple options 68 per slot. Depending on the individual characteristics of a viewer, for each slot a different option 68 is chosen. This way, with a limited amount of additional effort during production many different instances of the commercial 64 can be created. For example, using the 13 segments 68 as shown in FIG. 3 (instead of 5 in a linear, single, commercial), a system according to the present invention can generate 36 (2×3×6) different instances of the commercial 64.

The present invention provides for the ability to customize personalized messages at the location in the delivery chain which best suits the requirements for personalization and delivery constraints. By selecting the best option for each slot to be played in the receiver (whether the set top box 58 or television 60, see FIG. 2), a last minute edit phase is added to the broadcast chain. By creating different variants of each slot, the present invention can create multiple versions of an entire audio feed, video feed, or TV channel, by combining the parts in different ways. By labeling the parts with personalization information 62, and distributing a user profile to near the end of the broadcast chain, for example to the STB 58, the STB 58 can make the final selection from the parts by matching the personalization information 62 against the user profile for each of the possible choices. That way the STB 58 creates a path through the entire set of content and presents the viewer with the best possible personalized television content.

As an alternative embodiment, the selection of segments may be performed on a pseudo-random or complete random fashion, to allow different variations of a personalized message by an audience. Any combination of selected segments by user profile personalization plus some randomness may be performed. Further, a system may keep track of which segments were previously shown to any audience, so in a next transmission, different segments not before seen by the audience can be shown.

Figure 4:
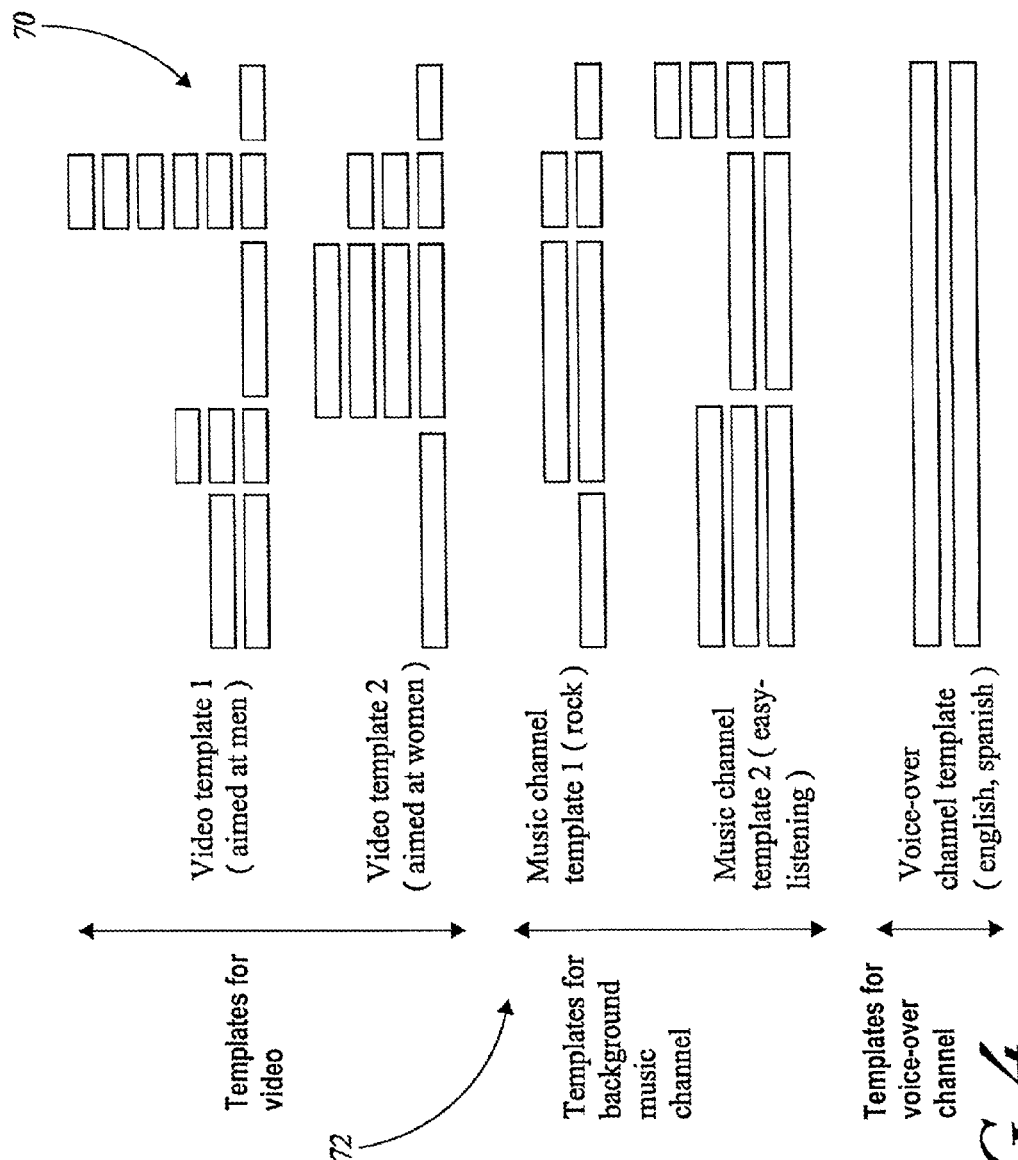
FIG. 4 shows a set of audio and video templates for an example personalized message.

In its most simple case, each slot 66 contains both audio and video (i.e., both have the same template structure), but it is possible to have separate templates 72 FIG. 4 for audio and video. The reasons for having different templates for audio and video are twofold. The first reason is an artistic one. Creative artists and authors of personalized ads generally want different variations in the audio and the video flow. The second reason is technical. In currently existing audio coding standards (including AC-3, MPEG-2, and many others), audio samples are grouped into frames (having a length of, for example, 32 milliseconds). This means that audio slots must be aligned at audio frame boundaries to be able to make a seamless switch from one slot to the next. If the slots are not aligned, on frame boundaries, the slots must be padded with silence, which is disadvantageous as it leads to a break-up of the ad. Given the requirement of aligning audio slots at audio frame boundaries, it is difficult to let video and audio slots end at exactly the same time without compromising the seamless transition between slots. This means that typically audio and video will have different templates.

For audio it is even possible that each channel (for example, background music, voice-over, sound effects, . . . ) has its own template 72. Furthermore it is possible to have multiple templates 72 for each video and/or audio channel. The template 72 to use is then selected before the commercial starts playing (again, based on available knowledge on the viewer in viewer profiles). FIG. 4 shows an example of such a multi-template commercial (three different channels; two of those have two different templates to choose from).

Figure 5:
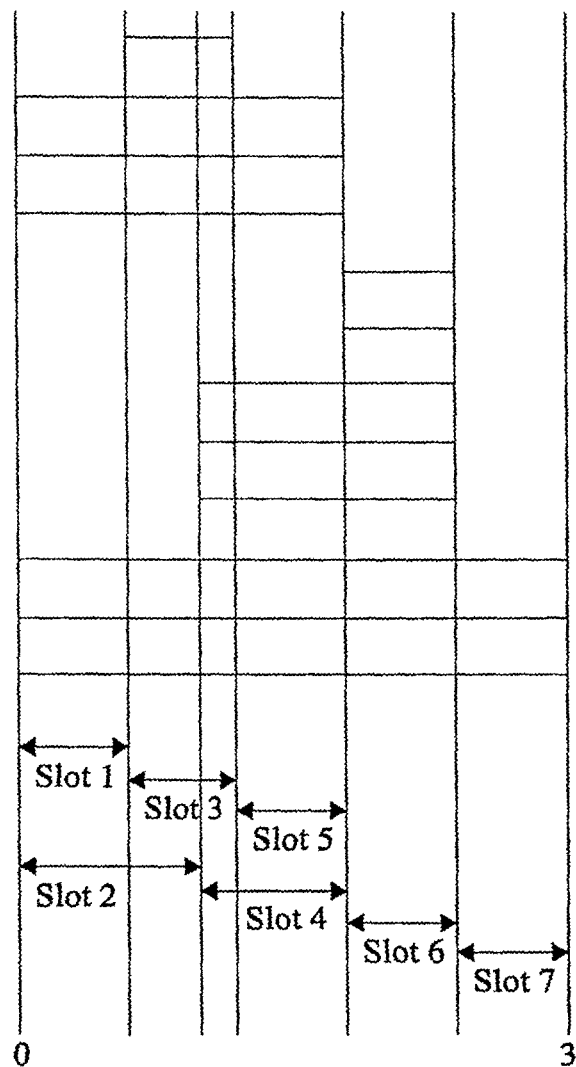
FIG. 5 illustrates how overlapping slots occur for an example personalized message.

Yet another option is allowing overlapping slots in a template as depicted in FIG. 5. The allowed switching between slots in this template is between slots that are exactly adjacent.

Figure 6:
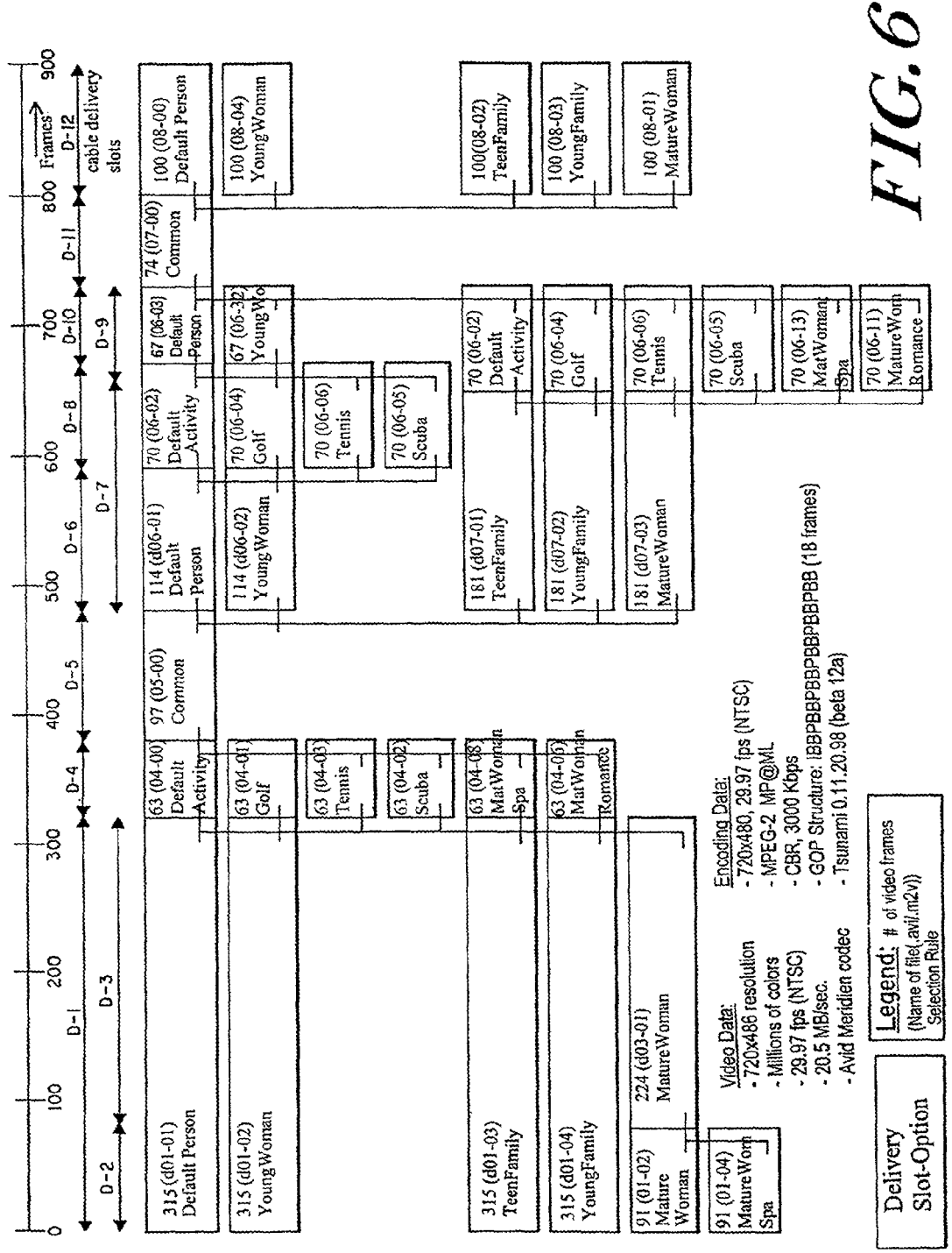
FIG. 6 shows an example video template for a vacation commercial according to one embodiment of the present invention.

FIG. 6 provides a detailed example of a video template set up for a campaign to provide personalized commercials for vacationing in Bermuda. Based on the information or conjectures about the viewer, an appropriate segment will be selected to display. In this example, demographic information about the viewer allows the present invention to create a vacation commercial with great appeal for the viewer. This example template is coded using MPEG-2, as will be described in an illustrative embodiment provided below.

In a broadcast environment, where one source distributes exactly the same content to multiple receivers at the same time, each path through the commercial 64 that can be chosen from the templates 72 will need to have the same length. This constraint does not hold in a point-to-point situation, e.g., personalized commercials embedded in VOD, personalized news, Internet streaming, etc. In a point-to-point situation the source assembles a specific stream for an individual viewer.

Figure 1:
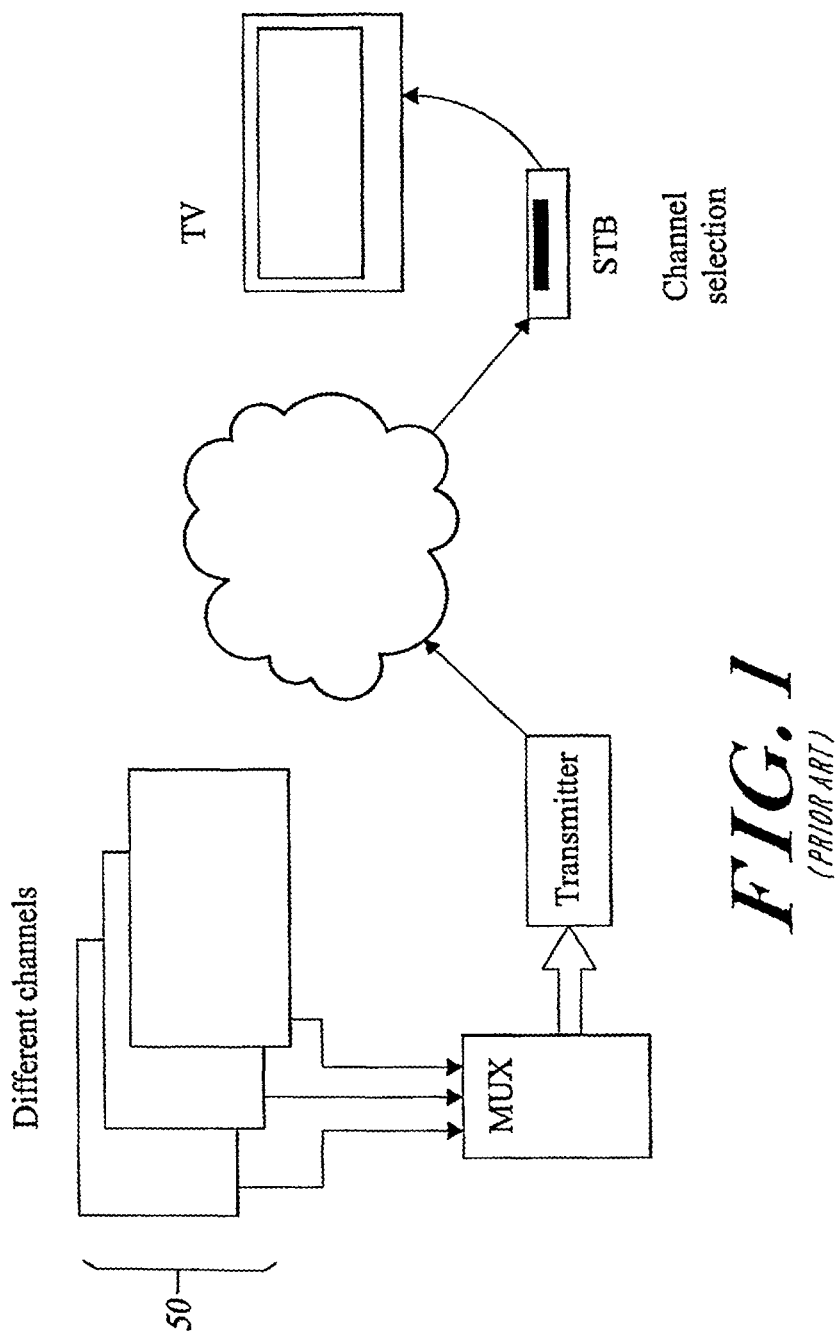
FIG. 1 is a block diagram showing a typical one to all broadcast television approach.
Figure 2:
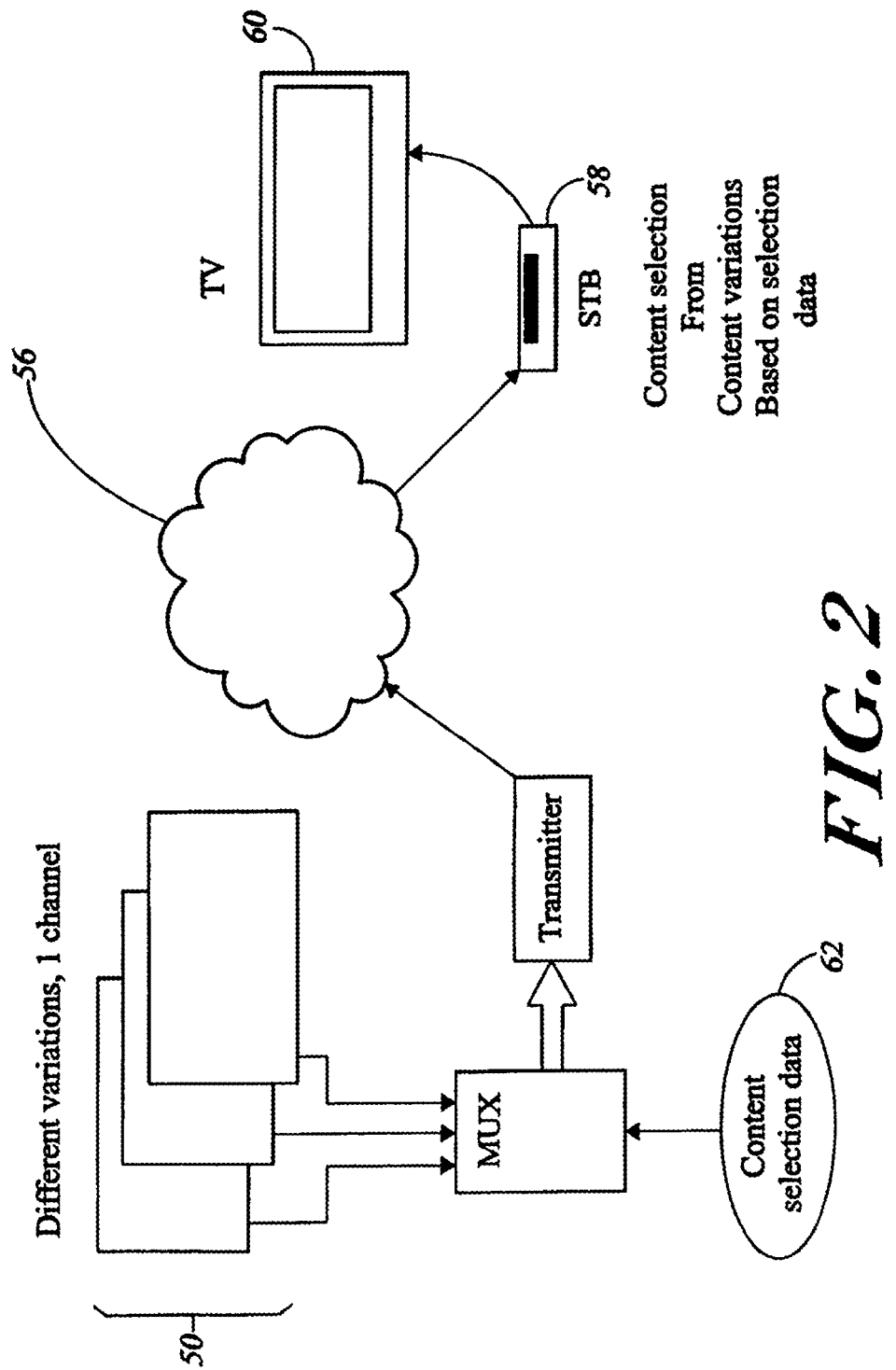
FIG. 2 is a block diagram showing a one to all broadcast television approach with additional data provided in accordance with the present invention.

To personalize a commercial 64 for each viewer in accordance with one embodiment of the present invention, the viewer-specific path through each template of the commercial 64 the selection of the option to play for each slot) will be selected at the latest moment possible (Just-In-Time-Advertising—JITA), based on information 62, FIG. 2, available on that viewer (e.g., from customer databases).

Another last-minute edit that can be done according to the present invention is the addition of last-minute information in the form of text or graphics overlays that can be added to the commercial 58 (FIG. 2) at the receiver. This last-minute information can be viewer specific (to achieve an even higher level of personalization) or global (e.g., information on the amount of products available in stock shortly before the commercial is aired). The last-minute information can also be distributed as part of the content selection data 62 as depicted in FIG. 2.

Figure 7:
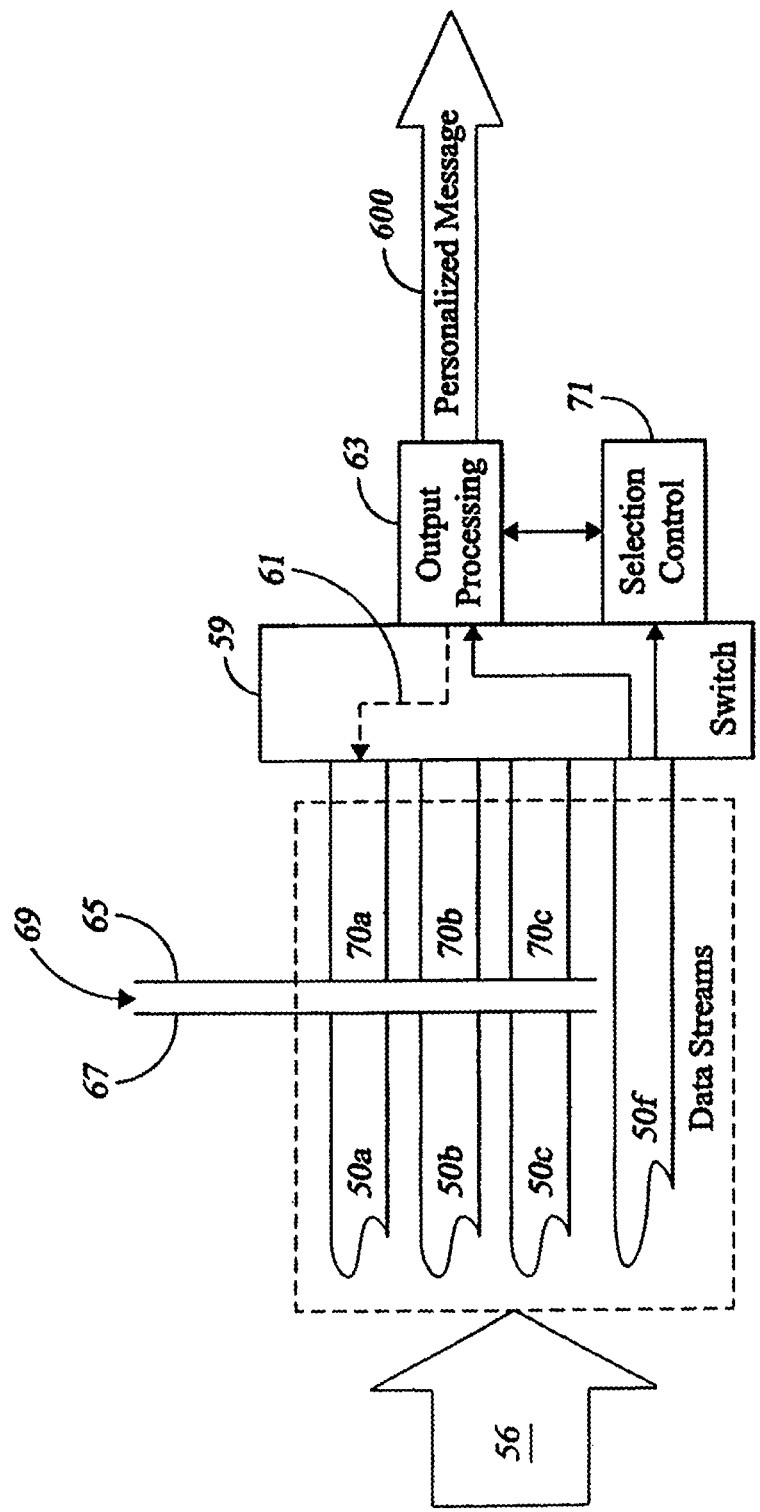
FIG. 7 is a block diagram of personalized data stream creation from simultaneous broadcast according to the present invention.

FIG. 7 provides an overview a personalized advertising in accordance with the present invention. Within a digital broadcast transmission 56, multiple individual data streams (channels) 50 are present. The present invention uses multiple channels 50 to each carry a different data segment (slot-option) 70 for a slot 66. The selection of what segment 70 to play for each slot, and the actual switching between slots is performed as close to the final point of delivery (e.g., a set-top box or a television). As will be described in detail below, this selection and switching may be performed in an STB (set top box). Selection is done based on rules (e.g., expert system based) expressed in terms of viewer profiles. These rules can be associated, for example, with templates and individual data-segments.

To allow a switch 59 to switch between data-segments in data streams 50, the segments 70 are broadcast simultaneously on each data stream 50. For this example, three data streams 50*a-c* are shown, data stream 50*f* will be described below. The switch is presently set to data stream 50*a*, as shown by arrow 61. Since the segments 70 are simultaneously provided, they all have a synchronized end point (as shown by line 65), and the next set of segments have a synchronized start point (as shown by line 67). Because switching time by switch 59 is not instantaneous, a time gap 69 may be included between the end point 65 of one set of segments and the start point 67 of the next set of segments. This time gap 69 provides the delay necessary to allow the switch 59 to change seamlessly from one data stream 50*a* to another 50*b*. Output processing 63 may include buffering and other processing techniques for the data, for example to eliminate any gaps, or to add additional features to the data stream such as graphic overlays, as will be discussed below.

Although only three data streams 50*a-c* are shown, the present invention can use as many data streams or channels 50 to simultaneously deliver as many segments as needed. Also, multiple sets of data streams can be stacked into a broadcast, e.g., one set for a video template, and one for an audio template.

One or more additional data streams 50*f* may be used to carry data which assists in using the multiple segments. Such data can include the content selection data 62 FIG. 2, which provides information about each segment 70 and the appropriate segment to use. This information is used by a selection control component 71, which in an illustrative embodiment, also uses user profile information to determine which segment 70 will be selected at which time. Alternatively the content selection data 62 is incorporated into other data streams which might be delivered via other networks. The illustrative embodiment allows delivery of this content selection data in such a way that the entire broadcast remains backward compatible with existing receiver equipment. Also, because a default message is sent in-line with the regular broadcast, receivers that do not support personalization (i.e., do not have a software upgrade) will automatically show the default. Therefore, there is no reason to replace deployed receivers by personalized receivers when personalized transmissions start.

Another use for the additional data stream 50*f* is to provide audio, additional graphics, information, and transitional data. Audio requires much lower bandwidth than video, and therefore several different audio streams can be sent on one data stream, along with other data, and then buffered in the receiver (e.g., on RAM or hard-disk) for future playback.

Examples of transitions include fade-ins, fade-outs, morphs, and wipes between video segments, and cross fades between audio segments. These specific transitions (instead of clean cuts between segments) are occasionally wanted for artistic reasons. Transitions sometimes help in improving the flow of the message.

Transitional data sent over data stream 50*f* defines the transitions to be played when switching from one segment to the next. One option is transmission of transition instructions to the receiver, which then computes/generates the transitions either in software or using dedicated hardware. Another option, which requires less processing power in the receiver, is that the transitions are transmitted in MPEG-2 format, meaning that the transition video and audio streams are pre-computed before transmission. The switch 59 may select the correct transitional segment to connect a previous segment with a next segment. As an example, the switch 59 FIG. 7 has three possible segments 70*a*, 70*b* and 70*c*, which are followed by three other possible segments 50*a*, 50*b* and 50*c*. There are a total of nine possible transitions between the first three segments 70*a-c* and the next three segments 50*a-c*. This is a simple combinatorial calculation, where the first segment 70*a* may be followed by one of three segments 50*a-c*, and the same for other first segments 70*b* and 70*c*. Therefore, the solution is to pre-encode all nine possible transitions, and provide them to the switch 59 in time to allow the switch 59 to select the proper transition to fill in between the selected first segment 70 and second segment 50. The transitions are relatively small compared to the lengths of the segments being provided, therefore all the transitions may be provided over the one additional data stream 50*f*, and stored in a buffer until the correct transition is selected and inserted into the output data stream 60. The transitions between the first segments 70 and the second segments 50 may be provided during the time the first segment 70 is being passed through the switch 59, and kept in a buffer.

Alternatively, if there are sufficient available data streams 50, the transitions may each be sent by a different data stream 50, in a synchronized fashion with the regular segments, whereby the switch 59 does not need to collect and buffer the transitions ahead of time, but can simply select and switch to the proper data segment 70, wherein some data streams 50 include the segments, and some data streams 50 include transitions. The transitions are simply treated as other segments which go in a slot between the normal first selected segment and the next. En fact, since the transitions occur in between the segments, the data streams carrying the segments may be reused to include some of the transitions, while separate data streams only carry the transitions. Therefore, for the example of three data stream carrying three optional segments, with nine transitions, only nine data streams are needed to carry the simultaneous transitions, since the three segment data streams may also each carry one transition. Also, during the creative process it might be decided that certain transitions do not make sense from a story-telling, perspective. In that case even less transition streams might be needed as some combinations of segments will never occur.

An alternate method for addressing the transition between segments is to make all segments 70 start and/or end in a similar manner. This would avoid the use of dedicated transition segments for changing between the other segments 70 and require no extra bandwidth.

Figure 8:
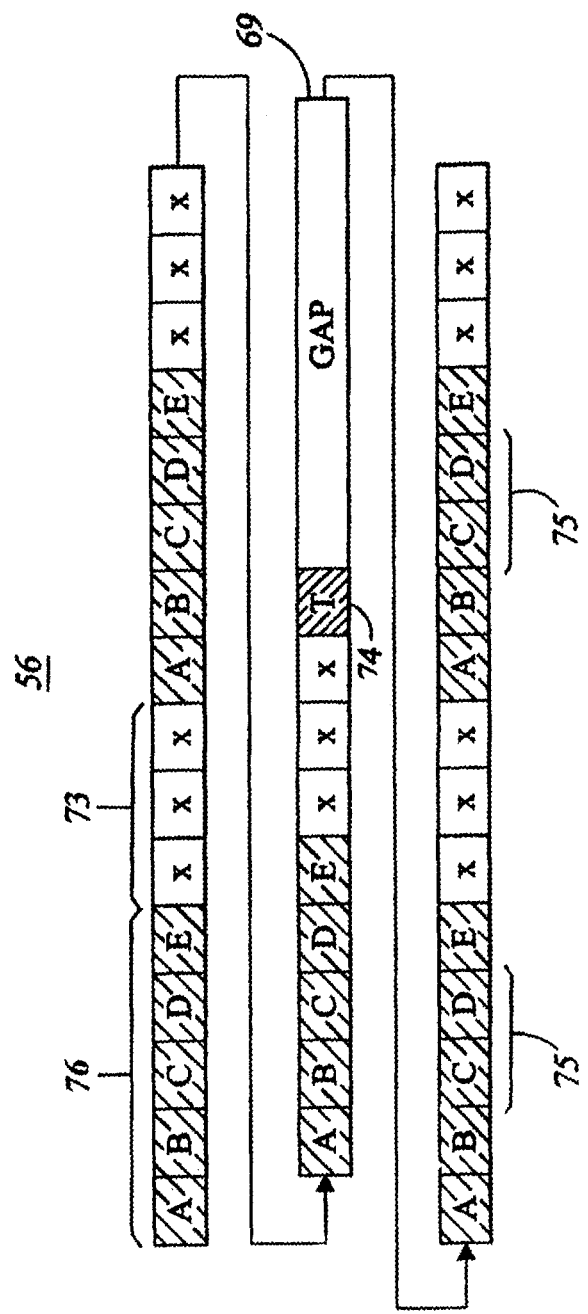
FIG. 8 is a data stream prepared according to one embodiment of the present invention.

An illustrative embodiment of a data transmission stream 56 coded as an MPEG-2 transport stream is shown in FIG. 8. The packets belonging to the multiple data streams 76 are labeled A-E. Packets A-D provide simultaneous delivery of a specific (e.g., video) segment, while packets E deliver extra information for example information for switching between segments, etc. Other packets 73 provide other channels or information typical to a multiplexed transport stream. Packets 73 can also be NIL packets. Just before the occurrence of a gap 69, there is a switch trigger 74, which may be in the form of a specially coded packet, or a special flag encoded in another packet. The gap 69 (although depicted as empty) can contain any packets, such as NIL packets, or packets belonging to other information streams. After the gap 69, the data streams including the packets 76 continue as before. If fewer segments are needed for the next slot, for example only two optional segments are used for the next slot, then some packets 75 may be used to send other information, or are empty.

Figure 9:
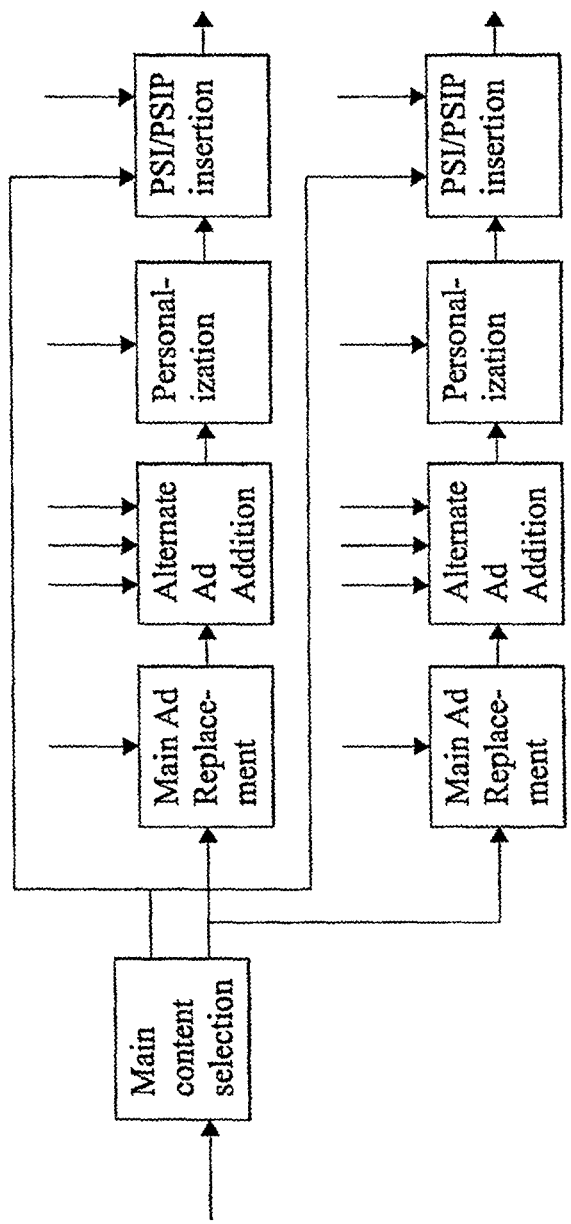
FIG. 9 provides head-end processing steps for personalization according to the present invention.

FIG. 9 shows the logical processing steps taken at the transmission side (e.g., in a cable head-end) to insert personalized messages into an MPEG-2 transport stream. In practice these steps are not necessarily in that order or may not even be recognized as individual steps. This depends mainly on the architecture of the insertion equipment and may vary from one set-up to another. Since incoming transport streams may carry several unrelated channels, the first step is to separate these channels to free up transport stream bandwidth necessary for the parallel insertion of the segments that are part of the personalized messages. The next step is replacing the existing ad (if necessary) with the main (default) choice of the personalized ad. After that the system according to this embodiment adds the additional choices (segments) for the personalized ad (third step) and adds the personalization information that informs the STB of the possible choices and timing (fourth step). Finally, since channels were removed from the transport stream and the personalization information was added, the PSI (program specific information, part of the MPEG-2 standard) is adapted to reflect the new situation (fifth step). This might include adding a private descriptor to the PMT (The Program Map Table, part of the PSI information) to signal the presence of personalized messages. Some of the SI/PSIP (DVB and ATSC extensions of MPEG-2) information might also have to be adapted to the new transport stream layout.

Figure 10:
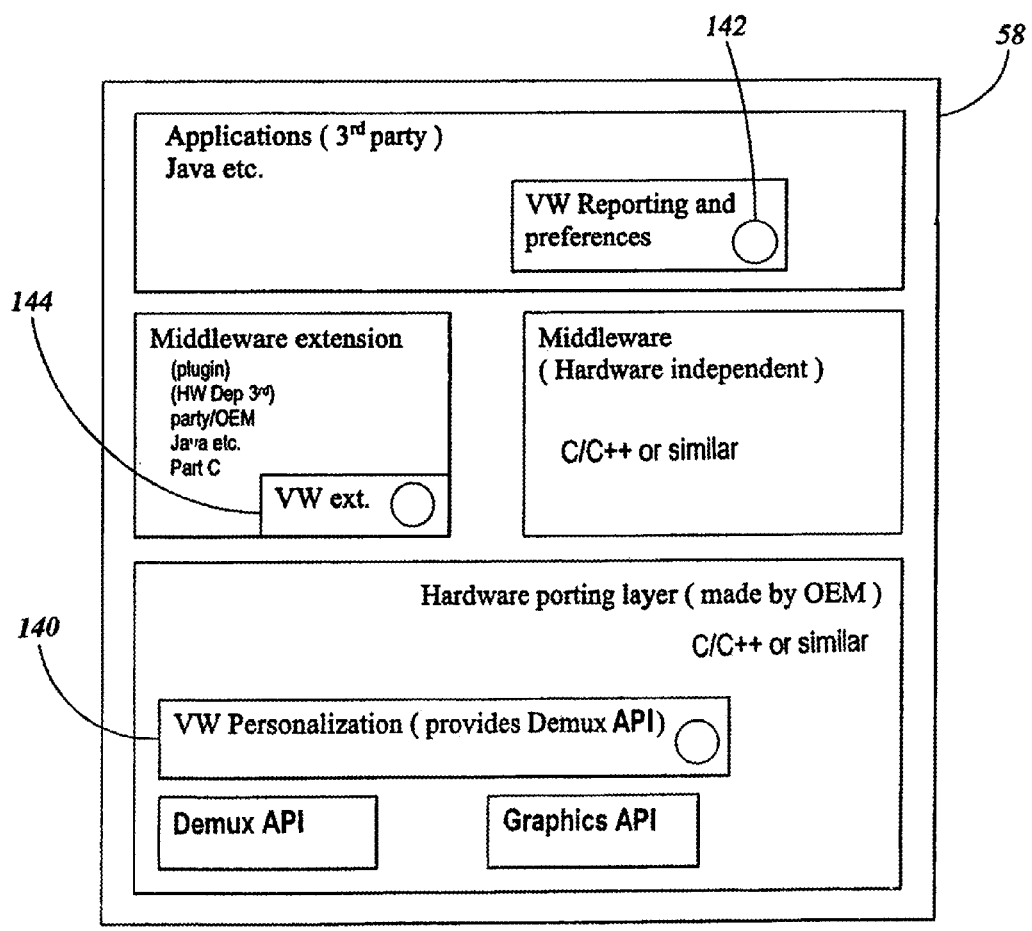
FIG. 10 provides details of distribution of responsibility in a receiver software system.

In one embodiment of the present invention, bringing the receiver 58 into the authoring chain requires changes to the software of the receiver 58. Components of the final television program are delivered to the receiver 58 and the receiver assembles the final program that best matches the personalization criteria. To a standard digital television receiver 58, the features of adding matching of profiles, switching to assemble the final content, and possibly reporting, are added. FIG. 10 shows a high-level overview of the software blocks of one example STB, including the modifications required for supporting personalization functionality. The personalization engine 140, the Reporting and preferences application 142, and the middleware extension 144 are personalization specific.

Figure 11:
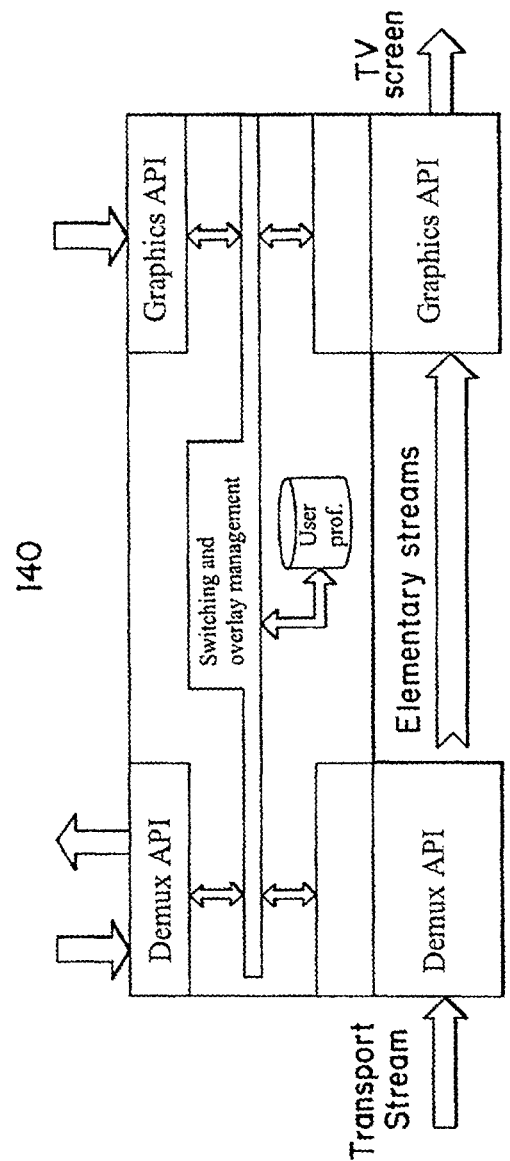
FIG. 11 shows details of a personalization engine, within a receiver.

The Personalization Engine (PE) 140 FIG. 11 is the heart of the slot based TV personalization within the STB. It controls the variant for each slot that will be shown to the viewer and will collect the viewing information for billing and personal tuning. The Personalization Engine 140 sits between the demultiplexer API and its client to intercept the settings for audio and video of the current channel and change them into the personalized versions. It uses the demultiplexer API to retrieve personalization control information/data, and to control the switching between the right media (audio and video) segments at the right time. To allow personalized text or graphics to be overlaid on the video, access to the low-level graphics API is also required. To the original client of the demultiplexer API it presents the same API, so that the client does not need changes in functionality. Depending on the graphics capability of the STB 58, the graphics API may be routed through the PE 140 in order to shut off any UI graphics for the duration of the text overlay or vice versa.

There is one extra bit of information that the PE 140 uses that is not typically available at this low level. This information is the PID of the personalization channel where the metadata (the information telling the receiver about the number and of slots, the PIDs for the slot-options, etc.) is transmitted. There are three possible solutions for this. In situations where the middleware has a high abstraction level compared to the HAL (Hardware Abstraction Layer) API, this information can be extracted from the PMT, which is typically parsed inside the OEM specific software. If the PMT is parsed in the middleware, there are two options, which are actually viable in all situations. The first is to double-parse the PMT: Capture the received PMT in the part of the PE that sits on top of the demultiplexer API and extract the information from this parse. There is no guarantee that the PMT requested by the middleware is the one that is actually used to play the current service, however, as the middleware might be pre-caching PMTs. The other way is to collaborate with the uplink part of the personalization chain and have a calculated PID assignment for the personalization channel. This can be either a fixed offset from a content PID or a fixed PID for every transport stream. In the future, middleware may be able to pass the personalization PID to the PE, similar to the way conditional access is nowadays integrated with middleware stacks.

The Personalization Engine 140, as part of its normal operation, creates a log of activity and viewing information for accounting and further customization. This information has to be delivered back to the central server on a regular basis. The way of delivering this information depends on the capabilities of the network and the STB 58. At a minimum either a cable modem or a PSTN modem will be present to allow the reporting facilities to work. Since these types of modems typically use some form of IP communication, and the middleware stack manages this communication link, it is probably the easiest to work through an application implemented on top of the middleware stack. Since one may also want to allow user preference settings, one can later extend the application with that functionality. For the user interface, the application can take full advantage of facilities offered by the middleware stack. Since most middleware stacks allow applications to be downloaded to the STB on the fly, the reporting and preference application can be updated with the latest features when necessary.

Whether or not an embodiment actually needs an application for reporting and preferences depends on the need to get the information to the server and on the need to allow users to influence their profile. If there is no need for any of these features, then the application will not be there. If only reporting is needed and there is a permanent link with the server by means of a cable modem, then the application will have no user interface.

In order to allow for last minute personalization for each individual receiver, rendering of extra information such as text, graphics, animations, synthesized audio and video is an attractive extra feature. The rendering result is subsequently overlayed over the broadcasted audio and/or video segments by the receiver. Rendering of text, graphics and animations can be done either at the transmission side (e.g., a head-end) or at the STB 58. If rendering is done at the transmission side, the resulting bitmap is placed in the broadcast transport stream and addressed to one specific STB. Because of bandwidth limitations, the rendered result cannot be overlayed with video at the transmission side; this has to be done in the receiver. If rendering is done in the STB, only the rendering commands have to be transferred. The STB should have sufficient rendering power to allow for this option. For both options, the STB must have sufficient graphics capabilities to support rendering with the required number of colors and resolution. For animations, even more processing power is required.

Graphics rendering on the STB is a difficult functionality. The STB resident software is likely to make use of the same graphics plane of the STB hardware as is required for displaying the rendering results for personalization. The most portable option is to go through the middleware software of the STB, but this may cause timing problems with the real-time (frame accurate) behavior of personalization overlays. The functionality of the overlay handling will need to be placed at a fairly low level within the STB software, and executing calls to the middleware API from this level may likely introduce reentrancy problems within the middleware stack. Also, most middleware APIs can only be called from applications running on top of the middleware, which is unsuitable for the real-time text/graphics overlay functionality. However, if the system does not use the middleware graphics or text capability for the text overlays, there may be a resource conflict with the use of the graphics hardware. This conflict can be resolved in several ways:

Make use of separate graphics hardware planes for overlay and middleware. This is obviously only feasible if the hardware contains at least one hardware graphics plane that is not used by the middleware.

Create virtual graphics planes. This would require a relatively large amount of extra memory for buffering of overlapped graphics information. The code would also need to be multithreading safe since both the middleware and the overlay processing will be making graphics API calls. It would provide the same level of functionality as the multiple hardware planes, but may affect performance.

Disable the overlay graphics for the duration of the user interface graphics display. This may be difficult to build. There will be a difficulty in predicting when there is no relevant user interface activity going on. There may be permanent graphics on the screen to signal channel numbers or other information. A better version of this may be to detect if the overlay area contains any non-transparent graphics and, if not, allow the overlay to proceed. As soon as UI graphics is displayed in the area, the overlay must be removed.

Disable the user interface graphics for the duration of the overlay. This is probably the least acceptable option because the user of the STB will not want his visible information to disappear just because a commercial in the background wants to do some text overlay. However, it is the easiest option to predict, since the exact timing of the overlay graphics is known in the personalization engine. It may still require some buffering to allow a restore of the graphics once the overlay disappears.

An element in letting the receiver do the final assembly of personalized messages, as just described in a specific embodiment of the present invention, is the protocol between the transmitter and receiver that allows the receiver to do the final assembly of personalized messages. This so-called broadcast protocol defines how content material and associated metadata and control messages have to be multiplexed into MPEG-2 transport streams. It is an extendible protocol framework designed to be backward compatible with existing digital broadcast.

Figure 12:
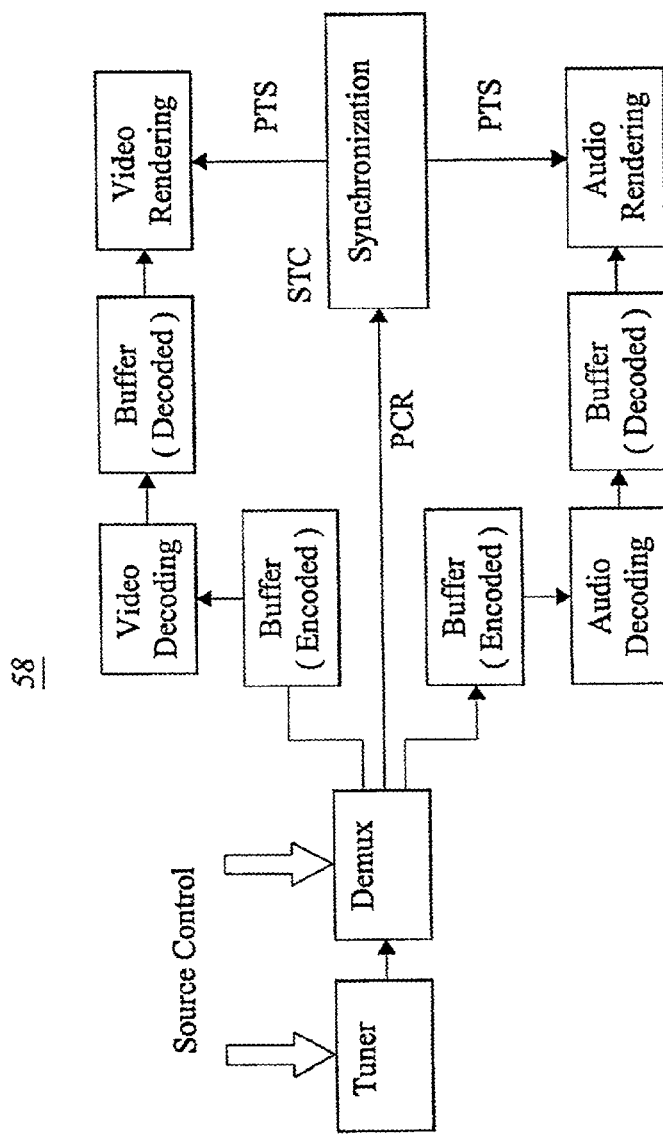
FIG. 12 is a block diagram of a typical receiver for digital television.

In order to allow reliable hardware independent switching between slots of the broadcast, the present invention allows one to specially format the transmission of the content data of the main and alternative channels. This is helpful because of the buffering mechanisms used in digital receivers 58, as illustrated by FIG. 12. This buffering, together with the multiplexing of MPEG-2 transport streams make it difficult to reliably switch between different content streams within the transport stream without visible or audible artifacts. In order to circumvent this problem, it is helpful to have as period of silence, or gap, 69, FIG. 8 in the data stream at the switching point. Due to the multiplexing techniques used in an MPEG-2 transport stream, it is possible to create such a gap in the content flow. Sending more information ahead to fill the buffers in the receiver to a higher degree achieves this goal. During the gap in the incoming data, the receiver will continue to process content from the buffer and the de-multiplexing circuitry can be switched safely to one of the alternatives, after which the content flow will continue from the new source.

Figure 13:
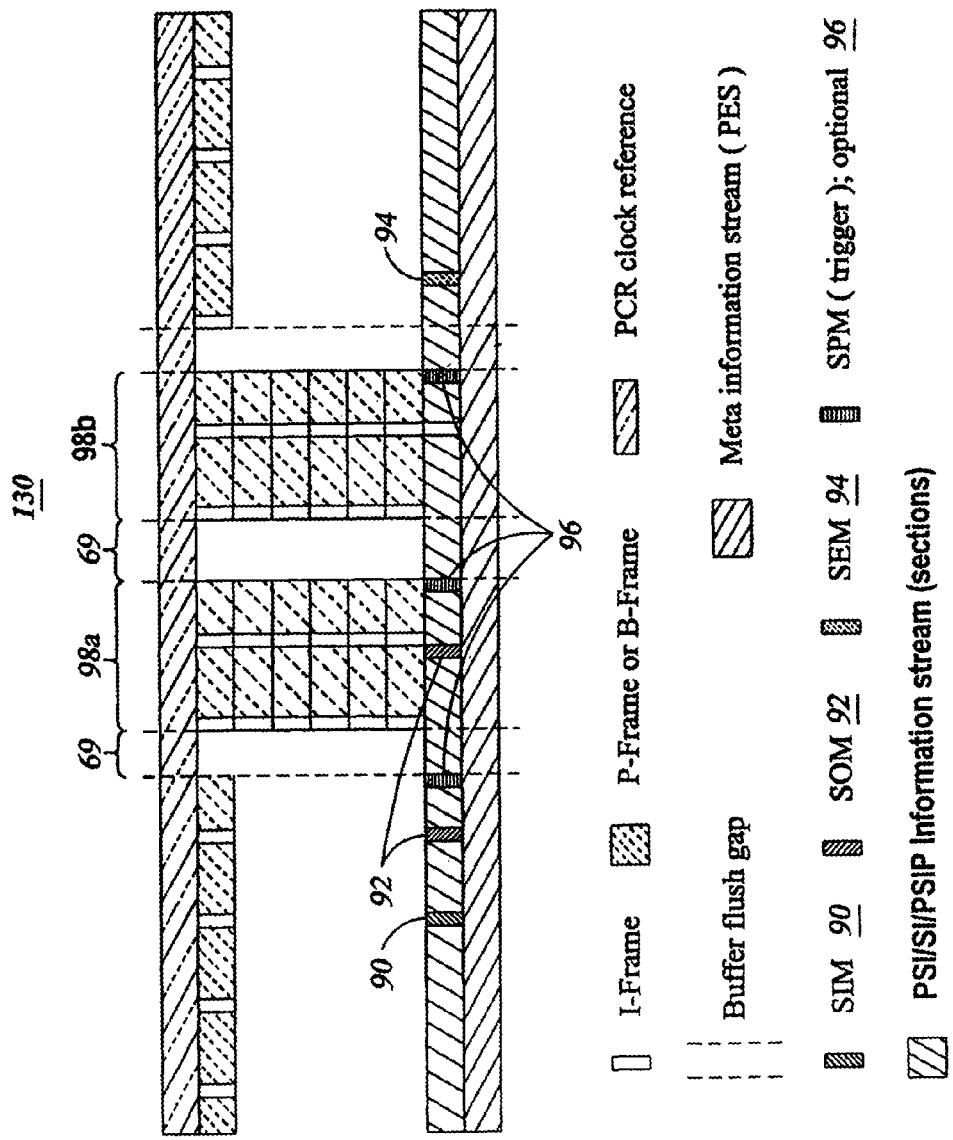
FIG. 13 illustrates the resulting transport stream layout according to the present invention.

FIG. 13 illustrates the resulting data stream 58 layout. In this case the content selection information added by the personalization application consists of the indicated SIM (Sequence Identification Message) 90, SOM (Sequence Option Message) 92 and SEM (Sequence End Message) 94, while the switch point trigger message is indicated by the SPM message 96. In this example the personalized ad comprises two slots 98, which have multiple choices of media data (e.g., video), and are preceded by gaps 69 to allow for switching time to an appropriate media data segment. The transport stream 58 shown indicates a personalized message inserted into a main program while that main program is the only one present in the transport stream 58.

By means of roadblocking the same personalized message could be used for multiple programs transmitted in the same transport stream. Roadblocking is used in television broadcasting, and means that different television channels are broadcasting commercials at approximately the same time. This is done to ensure that channel changing (zapping) consumers will remain seeing commercials, despite their zapping. This will obviously ensure that consumers cannot zap away from commercials to TV programming; they will always zap between commercials.

A generalization of this approach is roadblocking with the same commercial, meaning that during zapping, consumers will see the same commercial at approximately the same time.

In the present invention, roadblocking goes one step further, meaning that all television channels in one transport stream are aligned such that they switch to the same personalized commercial at the exact same (video and audio) frame. This type of roadblocking ensures zero overhead in bandwidth in the specific transport stream due to personalization of commercials. The transport stream can contain exactly the same number of commercials as a situation with non-personalized commercials.

Detail of various protocols for the illustrative embodiment will now be provided. The broadcast protocol messages that are sent over the Meta Information Stream (cf. 50*f* in FIG. 7), have at least indications of a personalization message or an overlay message. These broadcast protocol messages are sent as PES packets or MPEG-2 sections (e.g., private data sections).

The personalization protocol is an extension of the Broadcast Protocol, designed to allow content selection and assembly by the receiver 58 based on transmitted personalization information through the personalization protocol messages. The personalization protocol assumes that the STB has the user profile necessary to make the selections from the content information. The personalization protocol claims a message type and defines a message framework for all messages belonging to the personalization protocol, each identified by a message subtype. The personalization protocol covers the following messages:

Sequence Identification Message (SIM) 90

This message indicates the start of a personalization sequence. It assigns an identifier to the sequence, which will be used to identify the other messages belonging to the sequence. It also identifies the PIDs (streams) used for the personalized sequence. It also contains (optional) fields for copyright and authoring information.

Sequence Option Message (SOM) 92
This message announces an upcoming personalization switch point. It identifies the possible options, along with the selection criteria that drive the final selection. The message is linked to the sequence by means of the sequence identifier.

Switch Point Message (SPM) 96
This is an optional message following the SOM, which signals the actual start of the content gap that allows the switching of the decoder hardware to the new setting. It is linked to the sequence by means of the sequence identifier.

Sequence End Message (SEM) 94
This message signals the end of the entire sequence. After this message the sequence identifier is no longer valid and may be reused. The message is included for accounting purposes and is linked to the sequence by means of the sequence identifier.

A viable alternative to embedding the personalization media segments and control messages into the same transport stream as the TV program/channel the message is inserted into, is providing it via a different transport stream. In this alternative embodiment of the present invention, the receiver switches to the other transport stream at the moment the personalized message is to be played. This is typically indicated by a trigger message in the TV channel. Upon receipt of this trigger (which may contain the id of the transport stream to switch to), the receiver switches to the transport stream containing the personalized messaging content and metadata. At the end of playing the personalized ad, the receiver switches back to the transport stream containing the TV program. Depending on the capabilities of the receiver, the switch between transport streams might or might not be completely seamless. In case the hardware doesn't allow a seamless switch, the switch can be camouflaged, e.g., using a fade, a number of black frames, or using some rendered graphics. The broadcast protocol itself, as well as the personalization protocols do not need to be changed in this alternative embodiment.

A major advantage of this alternative embodiment is the saving in bandwidth when many personalized messages are broadcasted, divided over many different TV channels. Thus, the personalized messages can be concentrated in one (or a small number) of separate transport streams which can be completely filled with personalized messages (depending on the distribution in time). It can easily be seen that this leads to much less use of bandwidth compared to inserting the personalization messages into the same transport streams as the TV channels they become part of.

Yet another alternative embodiment of the present invention is a situation where the TV channel in which the personalized message will be played is analog instead of digital. In this situation the ad's media segments and control messages are, again, conveyed in a separate (digital) transport stream. In this embodiment, the analog TV channel will contain triggers (typically embedded as data in the VBI—Vertical Blanking Interval) that trigger the receiver to switch over to the digital transport stream containing the personalized message. This alternative embodiment would work in most current digital set-top boxes as these are usually also capable of playing/decoding analog television. The attractiveness of this embodiment is that this enables personalized ads in analog television channels. Again, depending on the receiver's hardware, the switches from the analog channel to the ad in the digital transport stream and back might or might not be seamless, depending on the specific capabilities of the hardware in the receiver. Typically, receivers with dual tuners will be capable of performing a seamless switch. In single tuner systems a camouflage similar to the one mentioned above might be employed to cover potential switching artifacts.

The overlay protocol also is an extension of the broadcast protocol. It is used to distribute text and graphics messages that must be overlaid on top of the video. It registers a message type and defines a Content Data framework message for the different overlay protocol messages. Overlay protocol messages can be targeted at a specific receiver by means of a unique receiver address. In order to identify the personalization option video that the overlay belongs to, the video channel is identified. A subtype identifies the type of overlay data that the message contains. The following subtypes are covered:

Text Overlay Message.
This is a fixed text string to be overlaid on the video at the specified time and screen location. It allows font specification within the limits of the font capabilities of the personalization engine.

Tagged Text Overlay Message.
This message is similar to the text overlay message, but the text may contain tags that are replaced with local information by the receiver. This allows the text string to be personalized with data that has been downloaded into the receiver.

Graphics Overlay Message.
This message is used when the rendering of the text has been done at the transmission side (i.e., the message is a bitmap), or when the overlay contains graphics.

In order to allow accounting of the actual viewed material, the STB needs to keep track of the personalized content that has been shown to the viewer. For this reason, the personalization engine typically keeps track of the paths chosen through the personalized content. This information can be transferred to a central server in some way. Unless this is done through a permanent connection, the information is stored on the STB between two accounting reporting moments. There are several options for this storage, including storage in RAM, NVRAM or physical media, etc.

If the STB has a hard drive, that can be used for non-volatile storage of the accounting information. The amount of information is very small, compared to video storage, so the capacity of a typical hard drive will be sufficient for long-term storage.

Another option is Smart Card storage. Storing the accounting information on a Smart Card allows physical retrieval of the information. The Smart Card could also be used to store the user profile information. The update of the user profile on the Smart Card could be done at the same time as the retrieval of accounting information from the Smart Card. The amount of storage available depends on the Smart Card and should be enough for accounting purposes. One problem with this solution might be that a Conditional Access Smart Card, which cannot be used for the purpose of accounting, occupies the available Smart Card slot.

Details for options for distribution of the user profile information to the STBs will now be presented. While typically one option is chosen for a specific network, each network may need to choose a different option because of differences in STB capabilities.

One option is Broadcast carousel, since there will probably be a significant amount of bandwidth available between the customization slots, that bandwidth can be used to distribute the user profiles to the receivers. The user profiles are transmitted cyclically in a database distribution carousel that carries the User Profiles of all receivers on that part of the network. In a cable network this is possible, since the number of users is limited. In a satellite network the amount of information may be so big that the repeat rate would become too low. If the repeat rate is high enough, there may not be any need to store the profile in non-volatile memory in the STB.

Another option is overnight broadcast carousel. If the available bandwidth during peak hours is not high enough, the broadcast of the profile carousel can be moved to a low traffic time, if that is available. It can also be moved to a separate transport stream, and the STB can tune to that automatically if the user was not using it. This method may require non-volatile storage of the User Profile on the STB.

Another option is a permanent direct connection. Since an STB with personalization capabilities needs some way to retrieve the accounting information about the personalized TV content, there may be some form of communication with the server. This may be a cable modem with a permanent connection to the head-end. If that is the case, the STB can request the User Profile when necessary, and the server could signal the STB of an update in the profile. In this situation, there is no need for non-volatile storage of the User Profile in the STB.

Similar to fulltime direct connection, is direct dialup connection. The connection needs to be established each time it is needed. This means that there is no reliable way for the server to signal the STB of an update in the profile. It also means that the profile must probably be cached in non-volatile memory on the STB. It is acceptable to have the STB dial-in every time it is powered on, or at least once a day to receive the latest profile. That way non-volatile storage would not be required.

Finally, it is possible to transfer the user profile via physical distribution. This would likely be a form of smart card distribution. Physical distribution does not allow frequent updates of the user profile, but it does allow the system to work, even when no other communication channel was available. The Smart Card is also used for accounting, and may include some incentive to get the users to return the smart card. This method could be used for small-scale trial runs.

Although the present invention is described with embodiments specific to MPEG-2, the present invention may be used by any type of data transmission system, including analog and digital broadcasting, cable, cellular, satellite and terrestrial broadcasts, Video on Demand, Digital Versatile Disc (DVD), Internet, internet streaming video, ethernet, wireless, ATM, MPEG (including MPEG 1, 2, 4 and variations thereof), AC3 etc.

Although the invention has been shown and described with respect to illustrative embodiments thereof, various other changes, omissions and additions in the form and detail thereof may be made therein without departing from the spirit and scope of the invention.

What is claimed is:

1. A system for distributing at least one personalized message to an intended audience, the system comprising:
   a processor; and
   a non-transitory, computer-readable storage medium in operable communication with the processor, wherein the computer-readable storage medium contains one or more programming instructions that, when executed, cause the processor to:
      access at least one message template comprising a plurality of media slots, each of the plurality of media slots being configured to receive one of a plurality of media segments,
      transmit the plurality of media segments simultaneously using a plurality of data streams to at least one receiving unit, wherein:
         each of the plurality of data streams is configured to transmit one of the plurality of media segments,
         each of the plurality of media segments have a synchronized end point, and
         a time gap is arranged between each end point and a start point of a successive media segment,
      access a plurality of expert rules and at least one user profile associated with the intended audience, and
      direct the at least one receiving unit to assemble the at least one personalized message via switching between the plurality of data streams to retrieve and insert at least one of the plurality of media segments into each of the plurality of media slots based on the plurality of expert rules and the at least one user profile, wherein the time gap is configured to provide a delay to facilitate seamless switching between the plurality of data streams.

2. The system of claim 1, wherein the at least one personalized message is assembled in a just-in-time process.

3. The system of claim 1, wherein the plurality of data streams comprise MPEG encoded data streams.

4. The system of claim 1, wherein the plurality of data streams are multiplexed into a transport stream.

5. The system of claim 1, wherein a set top box is configured to receive analog data streams and digital data streams, wherein the set top box momentarily switches from an analog data stream to a digital data stream to play out the at least one personalized message.

6. The system of claim 5, wherein the set top is configured to switch from an analog data stream to a digital data stream responsive to receiving vertical blanking interval data.

7. The system of claim 1, wherein the computer-readable storage medium further contains one or more programming instructions that, when executed, cause the processor to transmit at least one data stream configured to transmit transitional data.

8. The system of claim 7, wherein the transitional data is configured to define at least one transition to be played when switching between the plurality of media segments.

9. A computer-implemented method for distributing at least one personalized message to an intended audience, the method comprising, by a processor:
   accessing at least one message template comprising a plurality of media slots, each of the plurality of media slots being configured to receive one of a plurality of media segments;
   transmitting the plurality of media segments simultaneously using a plurality of data streams to at least one receiving unit, wherein:
      each of the plurality of data streams is configured to transmit one of the plurality of media segments,
      each of the plurality of media segments have a synchronized end point, and
      a time gap is arranged between each end point and a start point of a successive media segment;
   accessing a plurality of expert rules and at least one user profile associated with the intended audience; and
   directing the at least one receiving unit to assemble the at least one personalized message via switching between the plurality of data streams to retrieve and insert at least one of the plurality of media segments into each of the plurality of media slots based on the plurality of expert rules and the at least one user profile, wherein the time gap is configured to provide a delay to facilitate seamless switching between the plurality of data streams.

10. The method of claim 9, wherein the at least one personalized message is assembled in a just-in-time process.

11. The method of claim 9, wherein the plurality of data streams comprise MPEG encoded data streams.

12. The method of claim 9, wherein the plurality of data streams are multiplexed into a transport stream.

13. The method of claim 9, wherein a set top box is configured to receive analog data streams and digital data streams, wherein the set top box momentarily switches from an analog data stream to a digital data stream to play out the at least one personalized message.

14. The method of claim 13, wherein the set top is configured to switch from an analog data stream to a digital data stream responsive to receiving vertical blanking interval data.

15. The method of claim 9, further comprising transmitting at least one data stream configured to transmit transitional data.

16. A receiver device configured to assemble at least one personalized message, the receiver device comprising:
- a processor; and
- a non-transitory, computer-readable storage medium in operable communication with the processor, wherein the computer-readable storage medium contains one or more programming instructions that, when executed, cause the processor to:
  - receive at least one message template comprising a plurality of media slots, each of the plurality of media slots being configured to receive one of a plurality of media segments,
  - receive a plurality of data streams configured to simultaneously transmit one of the plurality of media segments, wherein:
    - each of the plurality of media segments have a synchronized end point, and
    - a time gap is arranged between each end point and a start point of a successive media segment,
  - access a plurality of expert rules and at least one user profile associated with the intended audience,
  - assemble the at least one personalized message via switching between the plurality of data streams to retrieve and insert at least one of the plurality of media segments into each of the plurality of media slots based on the plurality of expert rules and the at least one user profile, wherein the time gap is configured to provide a delay to facilitate seamless switching between the plurality of data streams, and
  - present the at least one personalized message on a display device operatively coupled to the receiver device.

17. The receiver device of claim 16, wherein the at least one personalized message is assembled in a just-in-time process.

18. The receiver device of claim 16, wherein the plurality of data streams are multiplexed into a transport stream.

19. The receiver device of claim 16, wherein a set top box is configured to receive analog data streams and digital data streams, wherein the set top box momentarily switches from an analog data stream to a digital data stream to play out the at least one personalized message.

20. The receiver device of claim 19, wherein the set top is configured to switch from an analog data stream to a digital data stream responsive to receiving vertical blanking interval data.

* * * * *